United States Patent
Timmins (10) Patent No.: US 6,816,580 B2
(45) Date of Patent: Nov. 9, 2004

(54) TECHNIQUE FOR ATTRIBUTING COMMUNICATION CALL TRANSACTIONS TO USER AFFILIATIONS AND ADJUSTING BILLINGS THEREOF

(75) Inventor: Timothy A. Timmins, Tigard, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 122 days.

(21) Appl. No.: 10/001,133

(22) Filed: Oct. 19, 2001

(65) Prior Publication Data

US 2003/0076939 A1 Apr. 24, 2003

(51) Int. Cl.[7] .............................................. H04M 15/00
(52) U.S. Cl. ............................. 379/114.23; 379/114.1; 379/114.12
(58) Field of Search .................. 379/114.05, 114.06, 379/114.12, 114.23, 114.1, 218.01, 114.01, 114.13, 114.18, 114.2, 114.22, 114.24, 114.28, 121.02, 121.03, 127.05; 705/412

(56) References Cited

U.S. PATENT DOCUMENTS

| | | | | |
|---|---|---|---|---|
| 5,631,904 A | * | 5/1997 | Fitser et al. | 370/261 |
| 5,729,598 A | * | 3/1998 | Kay | 379/114.29 |
| 5,745,556 A | * | 4/1998 | Ronen | 379/127.05 |
| 5,845,267 A | * | 12/1998 | Ronen | 705/40 |
| 6,216,111 B1 | * | 4/2001 | Walker et al. | 705/14 |
| 6,282,279 B1 | * | 8/2001 | Ricciardi | 379/219 |
| 6,411,803 B1 | * | 6/2002 | Malackowski et al. | 455/406 |
| 6,411,940 B1 | * | 6/2002 | Egendorf | 705/40 |
| 6,542,589 B1 | * | 4/2003 | Baskin | 379/114.05 |
| 6,553,022 B2 | * | 4/2003 | Hartmaier | 370/352 |
| 2001/0025275 A1 | * | 9/2001 | Tanaka et al. | 705/412 |
| 2002/0069176 A1 | * | 6/2002 | Newman | 705/53 |
| 2002/0069188 A1 | * | 6/2002 | Anvekar et al. | 705/412 |

* cited by examiner

Primary Examiner—Curtis Kuntz
Assistant Examiner—Barry W Taylor
(74) Attorney, Agent, or Firm—Kaye Scholer LLP (57) ABSTRACT

In prior art, a user can access a particular information assistance service provider only through the carrier contracting the particular provider by dialing special digits recognized by the carrier's switches. In accordance with the invention, an independent telephone number is assigned to the particular provider which enables the user to call the provider independent of the carrier used. When the user calls the provider for information assistance service using the independent telephone number, a user affiliation file associated with the user is retrieved. Such a file includes information concerning one or more user affiliations recognized by the provider. Part of the service charges incurred in the information assistance call are allocated to the recognized user affiliations, or the user as a credit, discount or other remuneration.

34 Claims, 4 Drawing Sheets

| ACCOUNT NO. | | EXPIRATION DATE | USE | |
|---|---|---|---|---|
| SEARS | 1234-56789 | NULL | INFORMATION ASSISTANCE SERVICES | 402 |
| MASTERCARD | 2345-678901-23456 | 9-20-03 | TICKET PURCHASES | 405 |
| AMERICAN EXPRESS | 3456-789012-34567 | 2-10-02 | RESERVATIONS | 409 |

|  | ACCOUNT NO. | EXPIRATION DATE | USE |  |
|---|---|---|---|---|
| SEARS | 1234-56789 | NULL | INFORMATION ASSISTANCE SERVICES | } 402 |
| MASTERCARD | 2345-678901-23456 | 9-20-03 | TICKET PURCHASES | } 405 |
| AMERICAN EXPRESS | 3456-789012-34567 | 2-10-02 | RESERVATIONS | } 409 |

FIG. 5

|  | ACCOUNT NO. | EXPIRATION DATE | USE |  |
|---|---|---|---|---|
| AMERICAN EXPRESS | 3456-789012-34567 | 2-10-02 | INFORMATION ASSISTANCE SERVICES | } 505 |

USER AFFILIATIONS
AICPA
AMERICAN BAR ASSOCIATION
} 503

TECHNIQUE FOR ATTRIBUTING COMMUNICATION CALL TRANSACTIONS TO USER AFFILIATIONS AND ADJUSTING BILLINGS THEREOF

FIELD OF THE INVENTION

The invention relates to a communications system and method, and more particularly to a system and method for identifying affiliations of a user for adjusting billings of communication call transactions conducted by the user.

BACKGROUND OF THE INVENTION

It is a common experience to call a telephone operator for information assistance. In a typical information assistance call, a user identifies to the operator the name and address of a party whose telephone number is desired. In response, the operator locates the desired destination number using, e.g., a computer database. The destination number is then provided to the customer, e.g., by a computerized voice response unit (VRU) which provides an automated voicing of the number, and the customer is afforded an option to be connected to the destination number without the need of first terminating the information assistance call.

Other services may also be provided through an information assistance call. For example, upon request, an operator may also provide a user with information on regional restaurants, movie listings, and directions to various places; and the ability to purchase goods and services, etc.

It should be noted that even though a user subscribes to a telephone service provided by a particular carrier (e.g., AT&T Wireless Services Inc.) or branding partner (e.g., Virgin), the information assistance service accessed through the telephone service may be contracted by the carrier, and is run by an independent contractor. That is, carriers may contract different independent providers to provide information assistance services for them. When a subscriber to the carrier makes an information assistance call by dialing such typical access digits as "411," "*555," "555-1212," "00," "1-800-555-1212," etc., because of the contractual relationship, the carrier would switch such an information assistance call to its contracted information assistance service provider to handle the call.

It should also be noted that the independent providers may provide different information assistance services and service features. For example, the assignee of the present application is an information assistance service provider which provides, among others, personalized services and special service features, which are different or lacking from other providers. For instance, one such service feature is a StarBack® service feature described in U.S. Pat. No. 5,797,092, whereby an information assistance caller after being connected to a desired party may be connected back to the assistance service provider by pressing a "*" key on his/her telephone, or otherwise issuing a command (e.g., saying the word "operator"). Examples of the assignee's personalized services include private directory assistance service and foreign language directory assistance service which are described, e.g., in U.S. Pat. No. 5,966,437 and International Publication No. WO 01/35621.

SUMMARY OF THE INVENTION

It is common that a user subscribes to two or more telephone services by different carriers, e.g., a wireless telephone service by a first carrier for travel use and a wireline telephone service by a second carrier for home use. However, it is undesirable that information assistance service providers vary with the carriers used, which is likely, because the user may have gotten accustomed to or prefer one information assistance service provider, and the products and features offered thereby, over another. It further proves to be confusing and inefficient when the user has to use multiple providers providing different information assistance services and service features. Moreover, in order to effectively utilize different information assistance service providers, personal information, e.g., private directory information, contained in a database of or accessible by one service provider needs to be synchronized with that of another service provider. Such synchronization is infeasible given dissimilarities in their services and database formats, not to mention a lack of communications between the service providers for technological, competitive, regulatory or other reasons.

The invention overcomes the prior art limitations by providing an "independent" telephone number to a user of a carrier, who prefers a particular information assistance service provider not contracted by the carrier, to access the particular service provider. The number is said to be "independent" as the user dialing that number would be connected to the particular service provider independent of the carrier used. For example, such an independent telephone number may be a toll free 1-800-XXX-XXXX number, 10-10-XXXX number, or a form of 411 with a prefix or suffix such as 411XX, etc. for any carrier to connect a user to the particular information assistance service provider, which is different from the prior art information numbers such as "411," "*555," "555-1212," "00," "1-800-555-1212," etc. reserved by a carrier for connection to its contracted information assistance service provider.

In accordance with an aspect of the invention, when the user calls the independent number to access the particular information assistance service provider, part of the charges for the call may be allocated to the user's affiliations recognized by the particular provider, which may have promoted or are given an incentive to promote use of the independent number or service. In general, an affiliation of a user can be any group or entity of which the user is a member or a subscriber. For example, one such affiliation may be a carrier to which the user subscribes and which contracts the particular provider to provide an information assistance service for the carrier. This carrier may enclose promotional materials with regular phone bills to its subscribers, informing them that the particular information assistance service provider is also reachable using the independent number especially when the carrier is not used.

In addition, the user may be a member of or otherwise associated with a group or organization, perhaps allowing group purchasing power, other than a telephone carrier or billing/collecting agency. Other user affiliations may be entities with which the user has an account through which the particular provider may collect information assistance service charges incurred by the user. Examples of such user affiliations include credit card issuers, debit card issuers, financial institutions, Sears, FedEx, Mobil, etc. Still other user affiliations may be entities through which no such billing/collection capabilities exist. With such affiliations, collections may be made through independent or other billing mechanisms.

Thus, in accordance with the invention, data concerning the user making a request for an information assistance service may be acquired, e.g., during a connection process. The user data includes, e.g., an automatic number identification (ANI) identifying the user's originating telephone number, or other information identifying the user, e.g., a personal identification number (PIN). At least one user affiliation may be identified based on the user data. The user affiliation information may alternatively be acquired during an inquiry by a live operator or other automated means, with or without use of the PIN or ANI. A portion of the charges for the information assistance service is allocated to the identified affiliation, or the user as a credit, discount or other remuneration. It will be appreciated that the information assistance request may also be made through a network other than a telephone network, such as a wide area network, the Internet, etc.

BRIEF DESCRIPTION OF THE DRAWING

Further objects, features and advantages of the invention will become apparent from the following detailed description taken in conjunction with the accompanying drawing showing illustrative embodiments of the invention, in which.

DETAILED DESCRIPTION

The invention is directed to a technique for accessing a desired information assistance service provider, regardless of which carrier a user utilizes. In prior art, the choice of an information assistance service provider is limited to the one that is contracted by the carrier used. However, a user oftentimes subscribes to two or more telephone services by different carriers, e.g., a wireless telephone service by a first carrier, say, XYZ Wireless Carrier for travel use, and a wireline telephone service by a second carrier, say, ABC Telco for home use. The traditional way of accessing an information assistance service provider, which is dictated by the carrier used, is undesirable in that the user may have gotten accustomed to or prefer one information assistance service provider, and products and features offered thereby, over another. It further proves to be confusing and inefficient when the user has to use multiple providers providing different information assistance services and service features. Moreover, in order to effectively utilize different information assistance service providers, personal information, e.g., private directory information, contained in a database of or accessible by one service provider needs to be synchronized with that of another service provider. Such synchronization is infeasible given dissimilarities in their services and database formats, not to mention a lack of communications between the service providers for technological, competitive, regulatory or other reasons.

In accordance with the invention, a user is afforded an alternative way to access a desired information assistance service provider, other than accessing it through the carrier contracting the provider as in prior art. For example, an "independent" telephone number such as a toll free 1-800-XXX-XXXX number, 10-10-XXXX number, or a form of 411 with a prefix or suffix such as 411XX, etc. may be assigned to the desired information assistance service provider for any carrier to connect a user to the provider, which is different from the prior art information numbers such as "411," "*555," "555-1212," "00," "1-800-555-1212," etc. reserved by a carrier for connection to its contracted provider. Thus, using the independent number in accordance with the invention, the user is connected to the desired information assistance service provider independent of the carrier used. In other words, with the invention, the choice of the information assistance service provider is advantageously not dictated by the carrier used.

Figure 1:
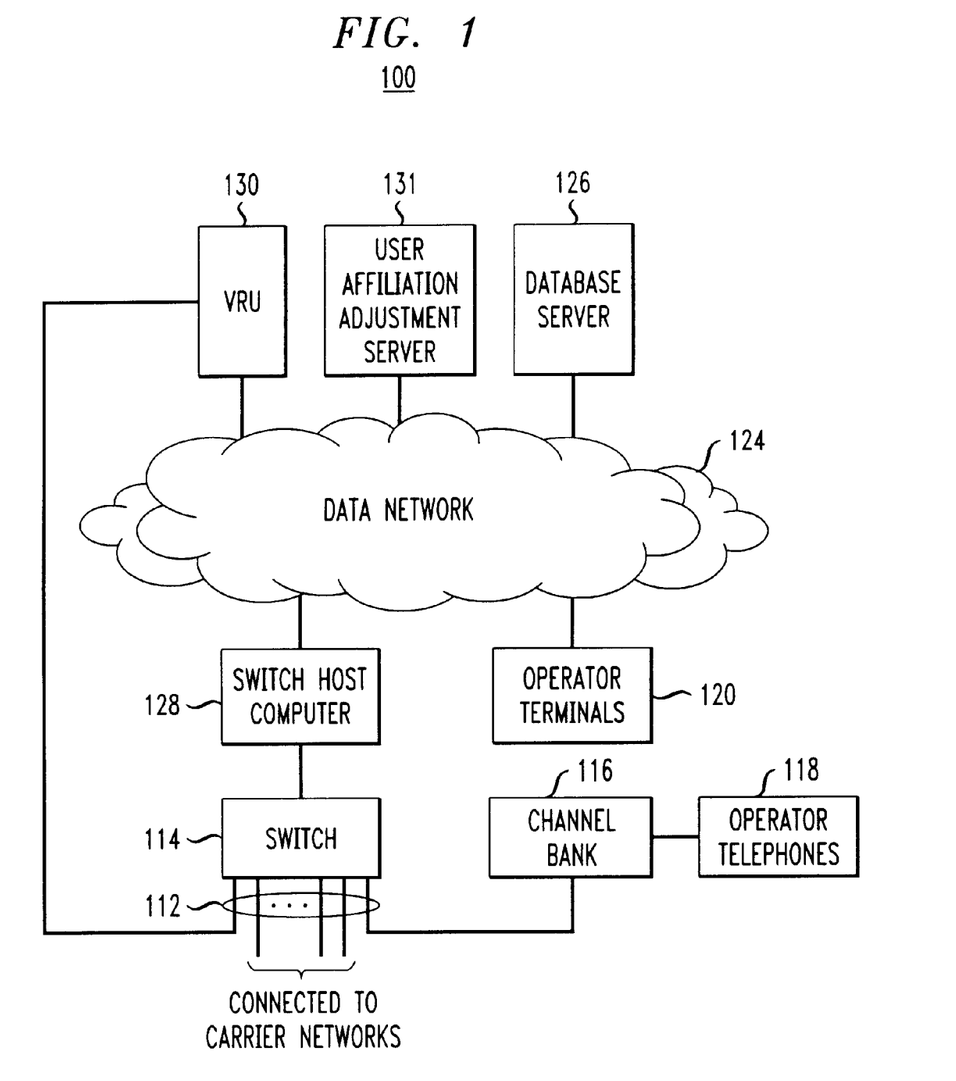
FIG. 1 is a block diagram of an information assistance system in accordance with the invention.

FIG. 1 illustrates information system 100 embodying the principles of the invention for providing an information assistance service. In this particular illustrative embodiment, system 100 can be accessed by users' dialing an independent telephone number through any carrier. Recognizing that the number is assigned to system 100, switches in the carrier network in a conventional manner route calls to that number to system 100.

As shown in FIG. 1, information system 100 includes switch 114 having T1 spans 112 for connection to voice response unit (VRU) 130, channel bank 116 and carrier networks. Channel bank 116 is used to couple multiple operator telephones 118 to switch 114. The operators in system 100 are further equipped with operator terminals 120, each of which includes a video display unit and a keyboard with associated dialing pad. Operator terminals 120 are connected over data network 124 to one or more database server(s) 126 (although only one is shown here). Switch host computer 128, VRU 130 and user affiliation adjustment server 131 in accordance with the invention are also connected to data network 124. By way of example, data network 124 includes a local area network (LAN) supplemented by a number of point-to-point data links.

System 100 may receive an incoming information assistance call from one of the carrier networks through a carrier switching center therein, which recognizes the aforementioned independent number assigned to system 100. It also places outgoing calls through one of the carrier networks which may be different than that used for the incoming call.

Switch 114 is conventional which includes digital signal processing circuitry providing the requisite conference capability, and DTMF and multi frequency (MF) tone generation/detection capabilities. In this illustrative embodiment, switch 114 supports digital Ti connectivity. The operation of switch 114 is governed by instructions stored in switch host computer 128.

Each incoming information assistance call from a user is received by switch 114 in system 100 which connects it to an available operator's telephone. If no operator is available when a call is received, the call is queued in a conventional manner until an operator becomes available. The queuing and call distribution in this instance is in accordance with a standard Automatic Call Distribution (ACD) algorithm. Operators may utilize database server 126 to provide information assistance including searching for a user's desired party and determining the appropriate destination number of the party. Other information assistance concerning regional restaurant recommendations, movie listings, etc. may also be provided by searching database server 126.

VRU 130 is used to play the constant repeated parts of an operator's speech, namely, the various greetings and signoffs (or closings). VRU 130 is connected via data network 124 to switch host computer 128 and via one or more T1 spans to switch 114. At appropriate stages in a call progression, switch host computer 128 initiates a voice path connection between VRU 130 and switch 114 such that the user, or the user and the operator, are able to hear whatever pre-recorded speech is played on that connection by VRU 130. Computer 128 then instructs VRU 130, via data network 124, what type of message to play, and passes data parameters that enable VRU 130 to locate the message appropriate to the call state.

For example, an information assistance call is received by system 100 via an inbound channel of one of T1 spans 112 at switch 114. The information assistance call may originate at virtually any communication device capable of communications with system 100, e.g., a wireless telephone, wireline telephone, personal digital assistant (PDA), mobile communication device, etc. In receiving the call, switch 114 also receives call set-up signals associated with the call which contain data concerning an automatic number identification (ANI) (i.e., the originating telephone number), a dialed number identification string (DNIS) for identifying the dialed telephone number, the area of the call's origination site, etc.

In accordance with an aspect of the invention, when the user calls the independent number to access the particular information assistance service provider, part of the charges for the call are allocated to the user's affiliations recognized by the particular provider, which may have promoted or are given an incentive to promote use of the independent number and the service. Alternatively, a tally of calls or the uses of products or features within a call may be used to offset other charges to the affiliation or even the user. For example, one such affiliation may be a consulting company whose group information assistance service charges are reduced by such an allocation. The allocation may also be used to reduce the user's bill for products and services provided by the user's affiliations, e.g., the user's cable TV bill where the user's cable TV service is an affiliation. Thus, an affiliation can be a group or an entity of which the user is a member or a subscriber. In this example, one such affiliation may be XYZ Wireless Carrier to which the user subscribes and which contracts the particular information assistance service provider. XYZ Wireless Carrier may enclose promotional materials with regular phone bills to its subscribers, informing them that the particular information assistance service provider is also reachable using the independent number especially when XYZ Wireless Carrier is not used. Additionally, the user may be a member of or otherwise associated with a group or organization, perhaps allowing group purchasing power, other than a telephone carrier or billing/collecting agency.

Figure 2:
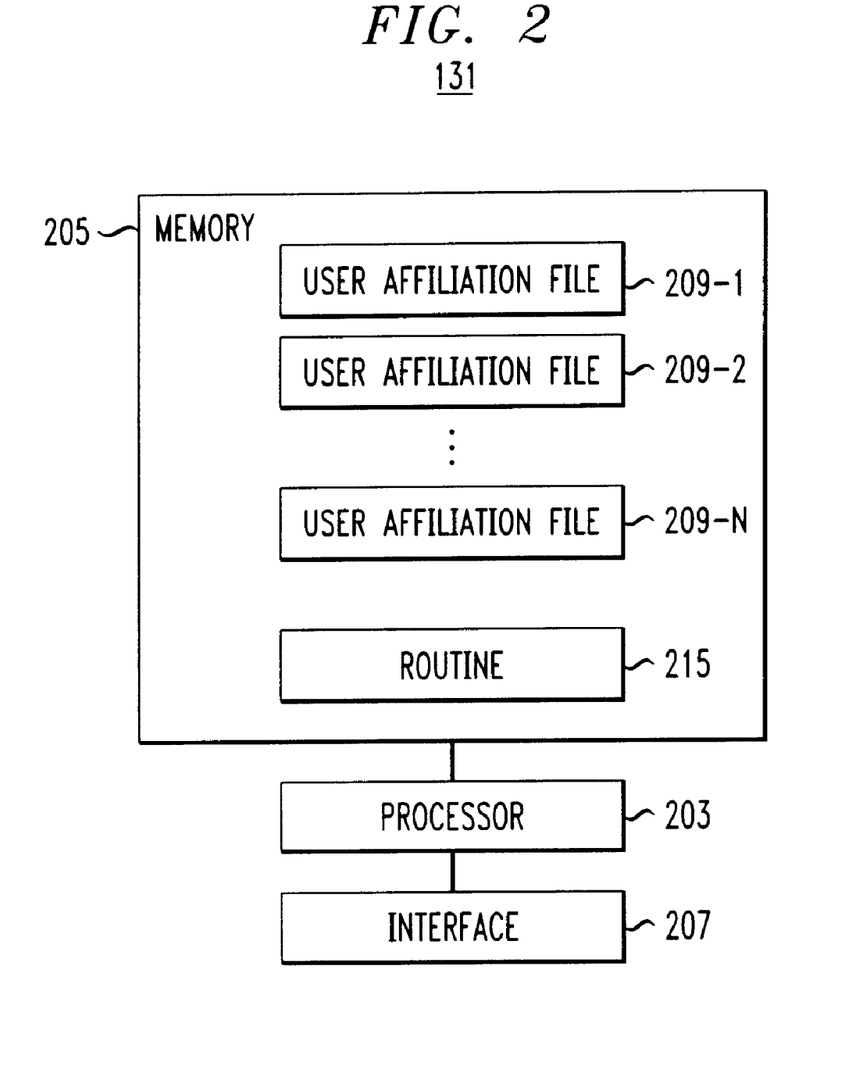
FIG. 2 is a block diagram of a user affiliation adjustment server in the system of FIG. 1.

In implementation, user affiliation files, denoted 209-1 through 209-N, are established and maintained in memory 205 in server 131 in FIG. 2, where N represents an integer greater than one. In this illustrative embodiment, each file is associated with a different user, and is identified by the user's telephone number from which calls to the aforementioned independent number normally originate. Such a user's telephone number hereinafter is referred to as the "user supposed originating number" and, in this instance, is the wireline telephone number from which the user normally calls system 100 using the independent number. The affiliation file may also be identified by a user name, or other identifiers identifying the user. A user affiliation file is established when a user is registered with the subject information assistance service provider, which registration may occur in the first information assistance call to system 100 using the independent number. During the registration, the operator handling the call may request information about the user including, e.g., the user supposed originating number and/or other information such as a PIN, user ID, etc. for identifying the user; and whether the user is a member of or a subscriber to any predetermined groups or entities which are recognized by the information assistance service provider as valid affiliations. In this example, the user is a subscriber to XYZ Wireless Carrier, which is one of the recognized affiliations. The affiliation information is included in an affiliation file, say, file 209-1 which is stored in memory 205 in association with the user supposed originating number and/or other user identifying information. After the user registration, part of the service charges for each information assistance call by the user to system 100 using the independent number is allocated to the affiliations recorded in the user affiliation file, in accordance with the invention.

Alternatively, no pre-registration may be required to use the subject information assistance service, and the necessary user affiliation information may be acquired by a live operator or other automated means in real time or on a call-by-call basis. This alternative arrangement is particularly advantageous when temporary promotions involving, e.g., calling cards and coupons for enticing new users to try out the subject service are employed.

Figure 3:
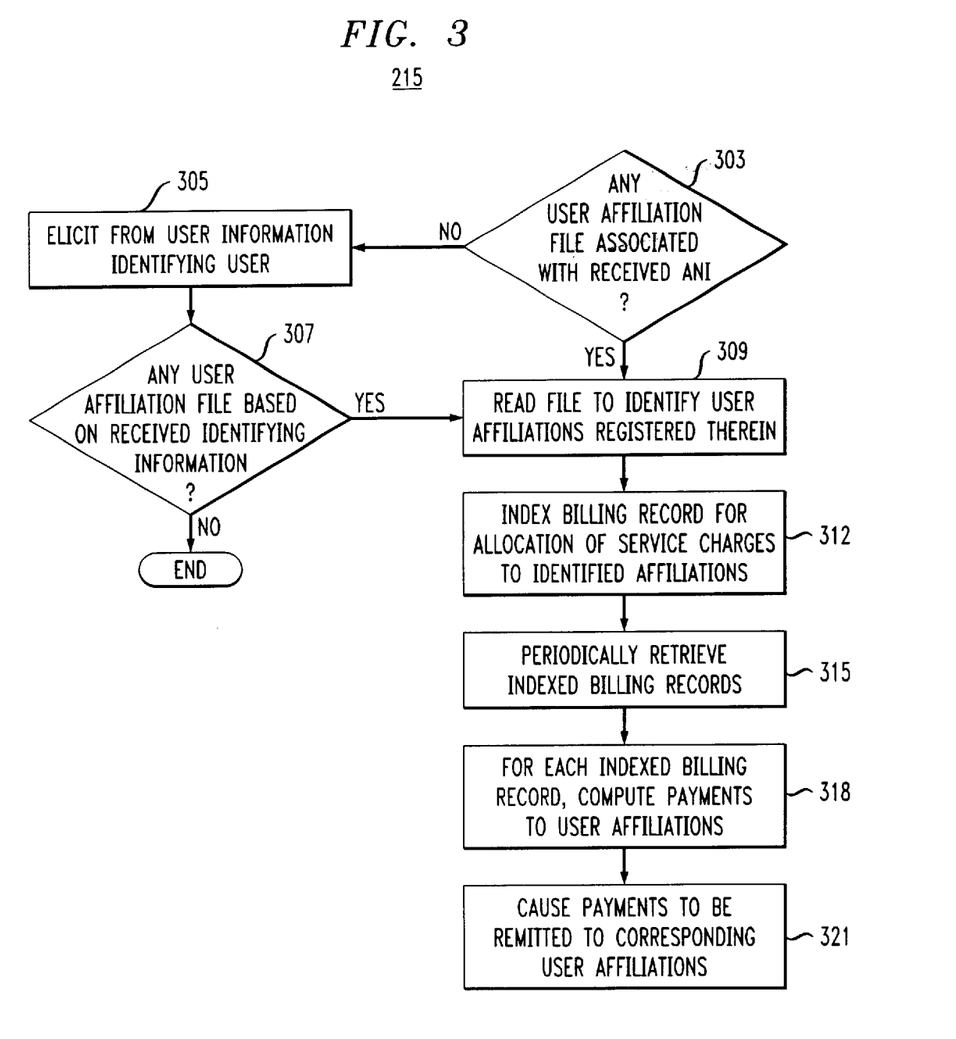
FIG. 3 illustrates a routine run in the server of FIG. 2.

By way of example, when the user calls system 100 using the independent number through the wireline carrier, i.e., ABC Telco in this instance, switch 114 receives the associated call set-up signals from the wireline carrier network, which contain information concerning the dialed telephone number (i.e., the independent number assigned to system 100), and the ANI (i.e., the telephone number from which the user calls). The received call set-up signals are monitored and processed by switch host computer 128. Based on the dialed telephone number information, switch host computer 128 determines that the user called the independent number to reach system 100. Computer 128 then transmits the ANI information to user affiliation adjustment server 131 through data network 124, and thereby triggers running of routine 215 which is stored in memory 205 in server 131 of FIG. 2. Such ANI information is received by processor 203 through interface 207 in server 131. Instructed by routine 215, and assuming that the user calls from the user supposed originating number previously registered, processor 203 attempts to locate any user affiliation file associated with the received ANI, as indicated at step 303. If the user affiliation file is not located, processor 203 causes a conventional interactive voice response (IVR) unit (not shown) which is programmed to verbally elicit from the user, through the established telephone connection, other information identifying the user relevant to locating the user affiliation file for fear that the user did not call from the user supposed originating number, as indicated at step 305. Voice recognition circuitry in the IVR unit in a well known manner recognizes the verbal responses from the user, and conveys the requested identifying information, e.g., the user's PIN, to processor 203. Processor 203 at step 307 attempts to locate any user affiliation file based on the received identifying information. If processor 203 cannot locate any such affiliation file, routine 215 comes to an end.

Otherwise, if processor 203 locates the user affiliation file, processor 203 at step 309 reads the located file to identify the user affiliations registered therein, which include XYZ Wireless Carrier in this instance. Processor 203 at step 312 indexes the billing record of the current call transaction for allocation of the service charges incurred by the user to the identified affiliations. Codes are used to represent the affiliations, respectively. In particular, one such code representing XYZ Wireless Carrier is incorporated in the billing record, which serves as an index for later payment to XYZ Wireless Carrier. For example, the payment may equal a selected percentage of the service charges. The selected percentage may be a function of the number of subscribers to XYZ Wireless Carrier, and/or amount of efforts by XYZ Wireless to promote the subject information assistance service.

When a user uses the subject information assistance service, the user typically is billed for the costs incurred through his/her own carrier connecting the current information assistance call, i.e., ABC Telco in this instance. In addition, any long distance charges, local connect time charges, wireless, page and any other charges incurred when performing the service are recorded for billing to the user. A billing subsystem (not shown) in system 100 compiles billing records for all such transactions in a database, and then provides a copy of the billing data to the appropriate carriers for billing the corresponding users.

In this instance, processor 203 periodically retrieves those indexed billing records from the database, as indicated at step 315. For each indexed billing record, processor 203 at step 318 computes the payments, or discounts or other remunerations, to the user affiliations represented by the respective codes therein. As mentioned before, the payment to a user affiliation in this instance is a function of the service charges indicated in the billing record and the selected percentage assigned to the user affiliation. Processor 203 at step 321 causes the payments as computed to be remitted to the corresponding user affiliations, including XYZ Wireless Carrier in this instance. Such remittances may be realized, e.g., via electronic funds transfer, as credits to the affiliations, etc.

In addition, the user of the subject information assistance service may receive discounts on or credits to the service charges incurred by the user, or other remunerations because of the user's particular affiliation(s) recognized by the information assistance service provider. For example, one such recognized affiliation may be a cable TV service subscribed by the user. By utilizing the subject information assistance service, the user receives a reduction of his/her cable TV bill, which varies with the amount of the information assistance service charges incurred by the user, or a coupon for an enhanced cable TV service, etc. Another recognized affiliation may be an airline having a frequent flyer program in which the user is a participant. In that case, the user is awarded frequent flyer mileage depending on the amount of information assistance service charges incurred by the user.

In the above embodiment, the information assistance service charges incurred by a user are collected through the carrier connecting the information assistance call for the user, i.e., ABC Telco in this instance. In a second illustrative embodiment, the service charge collection may be performed through one of the user's affiliations, rather than the connecting carrier. Thus, in this second embodiment, the user's affiliations may have a billing capability of which the information assistance service provider can take advantage to collect the service charges incurred by the user. In other words, the user has an existing account with such affiliations for billing, which include, e.g., credit card issuers, debit card issuers, financial institutions, Sears, FedEx, Mobil, etc.

Figure 4:
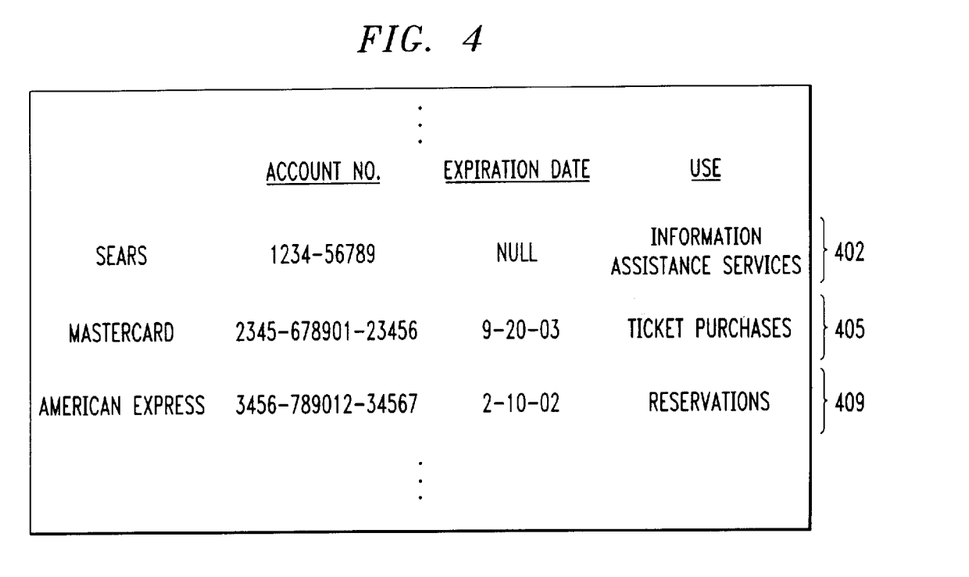
FIG. 4 illustrates a user affiliation file stored in the server of FIG. 2 in an embodiment of the invention.

FIG. 4 illustrates the data in a user affiliation file concerning certain user affiliations capable of billing the user directly. In addition, the file contains the user account numbers associated with such affiliations, and any expiration dates for the accounts. As indicated in row 402, the user in this instance preauthorizes the information assistance service provider to charge any information assistance service charges to his/her Sears account, subject to an agreement between the user and Sears, and between Sears and the service provider. In this embodiment, part of the service charges is allocated to the user affiliation collecting the service charges, i.e., Sears in this instance, thereby forging a business alliance with the affiliation. The user in this instance also provides data concerning his/her MasterCard account and American Express account in the event that the user for any reason decides to charge the service charges to one of those accounts, instead. Such an account change or selection by the user can readily be achieved with the help of an operator or a service menu by the aforementioned IVR unit.

In addition, having the user account information on record facilitates provision of certain special service features by the information assistance service provider. One such special service feature may be purchasing goods or services for the user. For example, when a user calls the service provider for a movie listing, the operator not only can provide the movie titles, and the corresponding show times and locations of the playing theaters, but also can offer to purchase tickets for the user in advance for a desired movie at a desired theater using charge account information on record, in accordance with the user's preauthorization. The user may then pick up the tickets at the movie theater or simply verify the ticket order at the door to gain admission. Other ticket purchases for sports games, concerts, operas, plays, shows, etc. may be similarly conducted. As indicated in row 405 of the user affiliation file of FIG. 4, the user in this instance preauthorizes the service provider to charge any such ticket purchases to his/her MasterCard account. Likewise, when the user requests hotel information from an operator, the operator can offer to make a hotel reservation for the user using charge account information on record, in accordance with the user's preauthorization. As indicated in row 409, the user in this instance preauthorizes the service provider to make reservations for hotel rooms, rental cars, etc. using his/her American Express account information.

Figure 5:
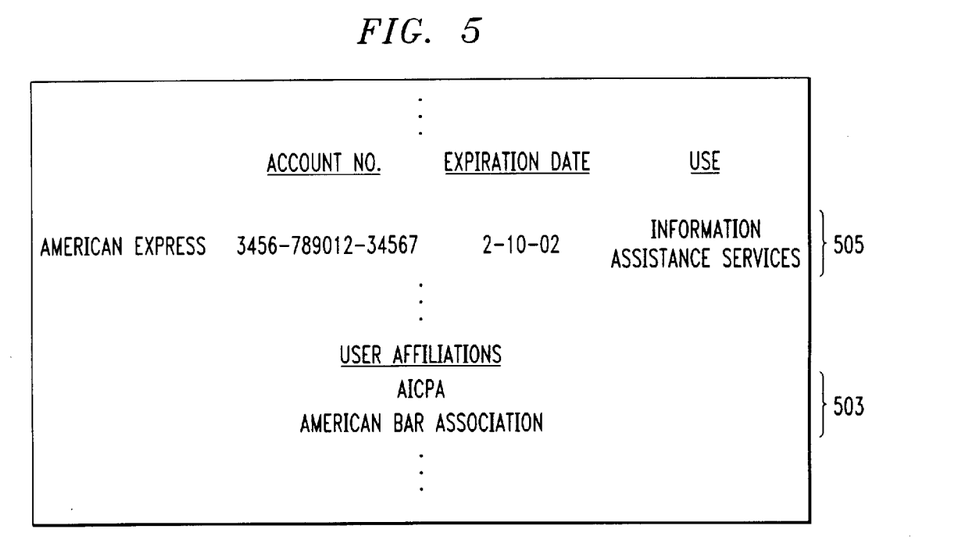
FIG. 5 illustrates a user affiliation file stored in the server of FIG. 2 in another embodiment of the invention.

In a third illustrative embodiment, although the agency for billing/collecting the information assistance service charges incurred by the user is also different from the carrier connecting the user's information assistance call, such a billing/collecting agency may be independent from the user affiliations. In other words, the user affiliations are not required to have capabilities of billing/collecting the information assistance service charges incurred by the user. FIG. 5 illustrates a user affiliation file in this third embodiment where the user affiliations have no such billing/collecting capability, which include, e.g., AICPA, American Bar Association, etc., as indicated in row 503. These user affiliations are independent from the actual agency, e.g., American Express in this instance, authorized by the user to bill/collect the information service charges, as indicated in row 505.

The foregoing merely illustrates the principles of the invention. It will thus be appreciated that those skilled in the art will be able to devise numerous other arrangements which embody the principles of the invention and are thus within its spirit and scope.

Thus, for example, it will be appreciated that the term "operator" used herein broadly encompasses entities that are capable of providing assistance in a telecommunication environment, including without limitation human operators, voice response/recognition capabilities, web-enabled operator services, and other automated and electronic access.

Further, it will be appreciated that system 100 may be implemented with in-band or SS7 out-of-band signaling.

Thus, where SS7 out-of-band signaling is used, system 100 receives the call set-up signals and call progress information (busy, ring-no-answer, number unavailable, answer supervision, etc.) coming from an SS7 signaling link, separate from the voice trunk.

In addition, in the disclosed embodiment, system 100 provides an information assistance service through a telephone network. However, based on the disclosure heretofore, system 100 can readily be re-configured by a person skilled in the art to provide the service through other networks such as a wide area network, the Internet, etc. In the case of the Internet, for example, the independent telephone number may be replaced by a predetermined uniform resource locator (URL) for the user to reach system 100 through the Internet using conventional computer equipment. In addition, the service may be provided to the user using multimedia facilities including text, voice and video facilities.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for use by a provider of an information assistance service, the method comprising:
   determining that a user is affiliated with at least one of entities which are predetermined by the information assistance service provider;
   maintaining a record associated with a user, the record containing information about the at least one entity with which the user is affiliated;
   obtaining data identifying the user when the user makes a request for an information assistance service;
   providing the information assistance service requested by the user, which incurs charges due to the information assistance service provider;
   determining, based on the data, the record associated with the user; and
   crediting, by the information assistance service provider, at least a portion of the charges to an entity with which the user is affiliated and which is selected based at least on the information in the record, an amount of the portion being a function of a number of parties affiliated with the selected entity.

2. The method of claim 1 wherein the request is made through a telephone carrier.

3. The method of claim 2 wherein the entities include a second telephone carrier contracting the information assistance service.

4. The method of claim 1 wherein the request is made through an Internet.

5. The method of claim 1 wherein the charges are collected from the user by an entity other than the selected entity.

6. A method for use by a provider of an information assistance service, the method comprising:
   determining that a user is affiliated with at least one of entities which are predetermined by the information assistance service provider;
   maintaining a record associated with a user, the record containing information about the at least one entity with which the user is affiliated;
   receiving call set-up signals associated with a call by the user for the information assistance service;
   deriving from the call set-up signals a call identifier;
   determining whether the call identifier corresponds to a predetermined identifier;
   obtaining data concerning the user when it is determined that the call identifier corresponds to the predetermined identifier;
   providing to the user the information assistance service, which incurs charges due to the information assistance service provider;
   identifying, based on the data, the record associated with the user; and
   crediting, by the information assistance service provider, at least a portion of the charges to an entity with which the user is affiliated and which is selected based at least on the information in the record, an amount of the portion being a function of a number of parties affiliated with the selected entity.

7. The method of claim 6 wherein the call identifier includes a telephone number to which the call is made.

8. The method of claim 6 wherein the predetermined identifier includes a telephone number for access to the information assistance service, the access being independent of a telephone carrier used.

9. The method of claim 6 wherein the data includes an automatic number identification (ANI) derived from the call set-up signals.

10. The method of claim 6 wherein the data includes a personal identification number (PIN).

11. The method of claim 6 wherein the charges are collected from the user by an entity other than the selected entity.

12. A method for use by a provider of an information assistance service, the method comprising:
    determining that a user is affiliated with at least one of entities which are predetermined by the information assistance service provider;
    maintaining a record associated with a user, the record containing information about the at least one entity with which the user is affiliated;
    deriving data from call set-up signals associated with an information assistance call by the user;
    providing to the user the information assistance service, which incurs charges due to the information assistance service provider;
    conducting during the information assistance call a transaction involving a transaction amount;
    identifying, based on the data, a plurality of accounts for billing the user, and the record associated with the user;
    charging to a selected one of the accounts the transaction amount; and
    crediting, by the information assistance service provider, at least a portion of the charges due to the information assistance service provider to an entity with which the user is affiliated and which is selected based at least on the information in the record, an amount of the portion being a function of a number of parties affiliated with the selected entity.

13. The method of claim 12 wherein the charges include cost for providing an information assistance service during the information assistance call.

14. The method of claim 12 wherein the selected entity collects the charges.

15. The method of claim 14 wherein the selected account includes a credit card account.

16. The method of claim 12 wherein the selected account includes a debit card account.

17. The method of claim 12 wherein the charges are collected from the user by an entity other than the selected entity.

18. A system for use by a provider of an information assistance service, the system comprising:

a mechanism for determining that a user is affiliated with at least one of entities predetermined by the information assistance service provider;

a database, which includes a record associated with a user, the record containing information about the at least one entity with which the user is affiliated;

an interface for obtaining data identifying the user when the user makes a request for an information assistance service, the information assistance service requested by the user being provided which incurs charges due to the information assistance service provider; and a processor for determining, based on the data, the record associated with the user, at least a portion of the charges being credited, by the information assistance service provider, to an entity with which the user is affiliated and which is selected based at least on the information in the record, an amount of the portion being a function of a number of parties affiliated with the selected entity.

19. The system of claim 18 wherein the request is made through a telephone carrier.

20. The system of claim 19 wherein the entities include a second telephone carrier contracting the information assistance service.

21. The system of claim 18 wherein the request is made through an Internet.

22. The method of claim 18 wherein the charges are collected from the user by an entity other than the selected entity.

23. A system for use by a provider of an information assistance service, the system comprising:

a mechanism for determining that a user is affiliated with at least one of entities predetermined by the information assistance service provider;

a database, which includes a record associated with a user, the record containing information about the at least one entity with which the user is affiliated;

a device for receiving call set-up signals associated with a call by the user for the information assistance service, a call identifier being derived from the call set-up signals;

a controller for determining whether the call identifier corresponds to a predetermined identifier;

an interface for obtaining data concerning the user when it is determined that the call identifier corresponds to the predetermined identifier, the information assistance service being provided to the user which incurs charges due to the information assistance service provider; and a processor for identifying, based on the data, the record associated with the user, at least a portion of the charges being credited, by the information assistance service provider, to an entity with which the user is affiliated and which is selected based at least on the information in the record, an amount of the portion being a function of a number of parties which are affiliated with the selected entity.

24. The system of claim 23 wherein the call identifier includes a telephone number to which the call is made.

25. The system of claim 23 wherein the predetermined identifier includes a telephone number for access to the information assistance service, the access being independent of a telephone carrier used.

26. The system of claim 23 wherein the data includes an ANI derived from the call set-up signals.

27. The system of claim 23 wherein the data includes a PIN.

28. The method of claim 23 wherein the charges are collected from the user by an entity other than the selected entity.

29. A system for use by a provider of an information assistance service, the system comprising:

a mechanism for determining that a user is affiliated with at least one of entities predetermined by the information assistance service provider:

a database, which includes a record associated with a user, the record containing information about the at least one entity with which the user is affiliated;

a controller for deriving data from call set-up signals associated with an information assistance call by the user, a transaction which involves a transaction amount being conducted during the information assistance call, the information assistance service being provided to the user which incurs charges due to the information assistance service provider; and a processor for identifying, based on the data, a plurality of accounts for billing the user, and the record associated with the user, the transaction amount being charged to a selected one of the accounts, the information assistance service provider crediting at least a portion of the charges due to the information assistance service provider to an entity with which the user is affiliated and which is selected based at least on the information in the record, an amount of the portion being a function of a number of parties affiliated with the selected entity.

30. The system of claim 29 wherein the charges include costs for providing an information assistance service during the information assistance call.

31. The system of claim 29 wherein the selected entity collects the charges.

32. The system of claim 29 wherein the selected account includes a credit card account.

33. The system of claim 29 wherein the selected account includes a debit card account.

34. The method of claim 29 wherein the charges are collected from the user by an entity other than the selected entity.

* * * * *